(12) United States Patent
Mou

(10) Patent No.: US 7,068,596 B1
(45) Date of Patent: Jun. 27, 2006

(54) INTERACTIVE DATA TRANSMISSION SYSTEM HAVING STAGED SERVERS

(75) Inventor: Hensen Mou, San Jose, CA (US)

(73) Assignee: Nevco Technology, Inc., Milpitas, CA (US)

( * ) Notice: Subject to any disclaimer, the term of this patent is extended or adjusted under 35 U.S.C. 154(b) by 862 days.

(21) Appl. No.: 09/699,108

(22) Filed: Oct. 26, 2000

Related U.S. Application Data

(60) Provisional application No. 60/216,797, filed on Jul. 7, 2000.

(51) Int. Cl.
*H04L 12/26* (2006.01)
*G06F 15/16* (2006.01)

(52) U.S. Cl. .................. 370/229; 370/487; 709/203

(58) Field of Classification Search ............ 370/229, 370/230.1, 231, 235, 252, 230, 352, 401, 370/485, 486, 487; 709/200, 201, 202, 203, 709/217, 219, 227, 229, 231, 246, 218; 434/307, 434/368, 318; 725/86, 87, 88, 92, 100, 101, 725/102, 103, 104, 105
See application file for complete search history.

(56) References Cited

U.S. PATENT DOCUMENTS

| | | | |
|---|---|---|---|
| 5,133,079 A | 7/1992 | Ballantyne et al. ........... 455/4.1 |
| 5,550,577 A | 8/1996 | Verbiest et al. ................. 348/7 |
| 5,577,191 A | 11/1996 | Bonomi ....................... 395/502 |
| 5,579,308 A | 11/1996 | Humpleman ............... 370/58.1 |
| 5,646,676 A * | 7/1997 | Dewkett et al. ............... 725/92 |
| 5,654,516 A * | 8/1997 | Tashiro et al. ................ 84/601 |
| 5,659,539 A | 8/1997 | Porter et al. |
| 5,784,571 A | 7/1998 | Mantopoulos et al. . 395/200.77 |
| 5,810,603 A * | 9/1998 | Kato et al. ............... 434/307 A |
| 5,818,439 A | 10/1998 | Nagasaka et al. |
| 5,886,275 A * | 3/1999 | Kato et al. ..................... 84/609 |
| 5,886,732 A | 3/1999 | Humpleman ................. 348/10 |
| 5,899,699 A * | 5/1999 | Kamiya .................. 434/307 A |
| 5,915,094 A * | 6/1999 | Kouloheris et al. ......... 709/219 |
| 5,930,247 A * | 7/1999 | Miller et al. ................. 370/338 |
| 5,940,387 A | 8/1999 | Humpleman ................ 370/352 |
| 5,956,716 A | 9/1999 | Kenner et al. |
| 6,005,861 A | 12/1999 | Humpleman |
| 6,018,765 A | 1/2000 | Durana et al. |
| 6,020,912 A | 2/2000 | De Lang |
| 6,022,223 A * | 2/2000 | Taniguchi et al. ....... 434/307 A |
| 6,055,560 A | 4/2000 | Mills et al. .................. 709/200 |
| 6,271,455 B1 * | 8/2001 | Ishigaki et al. ............... 84/605 |
| 6,442,599 B1 * | 8/2002 | DuLac et al. ............... 709/217 |
| 6,477,506 B1 * | 11/2002 | Ishii et al. ..................... 705/16 |
| 6,514,083 B1 * | 2/2003 | Kumar et al. ........... 434/307 A |
| 6,549,216 B1 | 4/2003 | Schumacher et al. |

\* cited by examiner

*Primary Examiner*—Brian Nguyen
(74) *Attorney, Agent, or Firm*—Beyer Weaver & Thomas LLP

(57) ABSTRACT

Methods and apparatus for use in a network including a local server coupled to a central server, the local server being coupled to a plurality of network devices, for interactively controlling from one of the plurality of network devices a flow of audio visual data from the central server to the network device, comprising obtaining a control command at the network device, the control command indicating a desired modification to the flow of the audio visual data from the central server to the network device. The control command is sent from the network device to the central server via the local server. A modified flow of the audio visual data is then received from the central server at the network device in response to the control command.

75 Claims, 14 Drawing Sheets

Examples of entering video titles:

Start-up TV screen

302

| 304 | 306 |
|---|---|
| Karaoke | 0 |
| Karaoke | 0 |
| Karaoke | 0 |
| Karaoke | 0 |
| Karaoke | 0 |
| Karaoke | 0 |
| Karaoke | 0 |

FIG. 3A

TV screen after all titles are entered.

308

| 310 | 312 |
|---|---|
| Movie | 35 |
| Karaoke | 68 |
| Karaoke | 52 |
| Karaoke | 818 |
| Karaoke | 73 |
| Movie | 19 |
| Movie | 27 |

FIG. 3B

IR REMOTE CONTROL INSTRUCTIONS

The following diagram is the IR remote control key positions

| TV/VIDEO 402 | NEXT 404 |            | ENTER 406   |
|--------------|----------|------------|-------------|
| 1  414       | 2  416   | 3  418     | VOL +  456  |
| 4  420       | 5  422   | 6  424     | VOL -  458  |
| 7  426       | 8  428   | 9  430     | ECHO + 460  |
| NTSC/PAL 408 | 0  413   | RESET 410  | ECHO - 462  |
|              | ↑  432   |            | FADER  464  |
| ←  436       | View/Menu 412 | →  438 | PITCH  466  |
|              | ↓  434   | SEEK  448  | HARMONY 468 |
| KEY -  450   | KEY N 454| KEY +  452 | MUTE   470  |
| SLOW   442   | STEP  446| PAUSE  444 | PLAY   440  |

Main Control Keys:

| NTSC/PAL | - Switches between NTSC and PAL modes. Default is PAL mode after power-up.

| Reset | - Reboots the set-top box.

| Next | - Stops the current video and starts the next video selected.

| Enter | - Press *enter* to change from karaoke to movie and vice versa.
Press *enter* to erase title 0.
Press *enter* after entering karaoke or movie title is completed.

| View/Menu | - After all karaoke or movie titles are entered, press this key to start playing video.
During video play, when this key is pressed, menu screen would come on and video titles can be added or edited.
Press this key again to start playing the video.

| Up/Down/Right/Left | arrow keys - Moves the cursor (indicated by gold color) up or down, right or left.

| 0-9 | number keys - Numbers are used to identify video titles.

*FIG. 4*

INTERACTIVE DATA TRANSMISSION SYSTEM HAVING STAGED SERVERS

CROSS-REFERENCE TO RELATED APPLICATION

This application claims priority of U.S. Provisional Application No. 60/216,797, entitled "INTERACTIVE DATA TRANSMISSION SYSTEM," filed on Jul. 7, 2000, which is hereby incorporated by reference for all purposes.

This application is related to U.S. application Ser. No. 09/698,701 filed on the same day, and entitled "INTERACTIVE DATA TRANSMISSION SYSTEM."

BACKGROUND OF THE INVENTION

1. Field of the Invention

The present invention relates generally to real-time data transmission across a network. More particularly, the present invention relates to real-time transmission of data and interactive modification of the data transmitted across a network in response to a request received from a network device over the network.

2. Description of Related Art

A popular pasttime in today's entertainment-oriented society is watching movies. In fact, many movie fanatics have acquired elaborate home entertainment systems solely for this purpose. However, for those individuals who decide to spend their Saturday night at home with a movie, there a limited number of options available to them.

Traditionally, movie goers who prefer to watch movies in the privacy of their own homes rent videos from a local video rental store. However, the video rental process is a time-consuming one, requiring the movie viewer to travel from his or her home merely to obtain the desired video. Of course, even with the obvious disadvantages associated with the video rental process, many still find this desirable since they can watch the movie as many times as they want, and they may pause, rewind, fast forward, and re-start the movie at their own convenience.

In view of the disadvantages associated with the conventional video rental process, pay-per-view is a viable option, particularly in hotels which often do not offer video rental services to its guests. Through the pay-per-view option, it is possible to select a video as well as view the video from the privacy of home or a hotel room. However, the movie choices typically offered to movie viewers by such cable providers are limited. Moreover, the pay-per-view option does not offer the advantages of a standard VCR. More particularly, the pay-per-view option does not allow a user to pause, rewind, fast forward, or re-start a movie once it has started. In addition, the available viewing times are typically set and therefore cannot be selected by a user.

Physical tapes are also used for a variety of purposes other than viewing movies. For instance, in Asian countries, karaoke is a popular pastime. A traditional karaoke business is commonly run with a central control room connected to multiple listening stations. The control room contains a machine associated with each listening station to enable a desired tape to be played and routed to the listening station (e.g., via a coaxial cable). When a karaoke participant in one of the listening stations requests a particular karaoke song, the appropriate tape is physically inserted into the machine connected to the listening station. The karaoke tape is then played and routed to the listening station connected to this machine.

The existing karaoke model is undesirable in a variety of ways. Since a machine capable of playing karaoke tapes is required for each listening station, the existing karaoke system often requires numerous machines. Since these machines are not automated, it is necessary to employ personnel that will be available to operate the machines. Due to the expense associated with acquiring and maintaining numerous karaoke machines and associated personnel, a traditional karaoke business is far from inexpensive to operate. In addition, it is typically necessary to maintain multiple copies of songs that are popularly requested in order to be able to fulfill the same song request when it is received from more than one listening station. Moreover, since multiple copies are often retained for these popular selections, the cost of maintaining an adequate inventory as well as storage space to store these copies increases the cost of such a karaoke business. In addition, the quality of a physical medium such as a video tape deteriorates over time. Moreover, since the karaoke tapes must be loaded and unloaded by humans, this type of system is susceptible to human error. As a result, the incorrect tape may be loaded or there may be a substantial delay between songs while the personnel are locating or changing the tapes. Thus, it is impossible for a karaoke participant to predict the time that a selected song will start. Similarly, it is impossible to predict the delay between songs that are loaded consecutively into the karaoke machine. It is also important to note that the karaoke singers in the listening stations do not have access do the machine associated with their private listening station. Thus, once a karaoke tape has been inserted, karaoke participants cannot interactively control their individual karaoke experience.

In view of the above, it would be desirable if a system could offer the interactive nature of a VCR without the limitations and conveniences associated with a VCR. In addition, it would be beneficial if a user were provided a wide range of choices previously unavailable to a VCR or pay-per-view user.

SUMMARY

The present invention enables data to be transmitted over a network from a server to a client device such as a set-top box. This may be accomplished via a single local server as well as via multiple staged servers, such as from a central server via the local server. For instance, the central server may be associated with a web site on the Internet. In addition, once initiated, data flow may be modified and controlled interactively by the user. Moreover, a file may be loaded from the central server to a memory associated with the local server. This loading process may be performed in combination with data transmission upon initiation by a user (e.g., via a web browser) or by the local server when a requested file is not accessible to the local server. Alternatively, it may be desirable to load a file independently from the data transmission process.

In accordance with one aspect of the invention, a first network device such as a set-top box may interactively control data flow from a second network device such as a server to the first network device. A control command indicating a desired modification to the flow of data from the second network device to the first network device is received at the first network device. The first network device sends a control command to the second network device. When the second network device receives the control command, the second network device modifies the flow of data from the second network device to the first network device in response to the control command. The first network device then receives a modified flow of data from the second network device to the first network. This process may similarly be performed across multiple staged servers rather than by a single local server.

Modification to the flow of data may be accomplished by modifying a data stream in a variety of ways. For instance, modification may include initiating transmission of a data stream, pausing transmission of a data stream, advancing transmission by a single frame, modifying the speed of transmission of data, and modifying the source of the data being transmitted (e.g., file and/or file location). Such a modification to the flow of data between network devices may be initiated by a user via an input device such as a mouse, keyboard, or remote control device.

In accordance with another aspect of the invention, a user may select one or more files from which data is to be transmitted over a network from a network device such as a server to another device such as a set-top box. Each of the files may include video data and audio data as well as other digital data. For instance, each file may include a movie or a karaoke video. The user may select via the set-top box one or more of a plurality of files associated with the server. In addition, the user may specify an order of transmission of the selected files. Information identifying the selected files as well as the specified order of transmission may then be sent from the set-top box to the server. Data stored in these files may then be transmitted from the server to the set-top box in the order of transmission.

In accordance with another aspect of the invention, the present invention enables transmission of data to be billed within a multiple site system such as a hotel. More particularly, it is possible to bill a guest each time a movie or karaoke song is played (i.e., transmitted from the local server). Moreover, the hotel may wish to bill the guest an additional amount when the requested selection is transmitted from the central server over the Internet to the guest's hotel room (e.g., when the user accesses the central server via a web browser). Of course, it may be desirable to bill a guest once (e.g., when the associated file is loaded from the central server to the local server), allowing the guest to view the selection multiple times.

BRIEF DESCRIPTION OF THE DRAWINGS

The invention, together with further advantages thereof, may best be understood by reference to the following description taken in conjunction with the accompanying drawings in which:

FIG. 3A is an exemplary screen shot that may be presented to a user upon start-up.

FIG. 3B is an exemplary screen shot illustrating the selection of karaoke songs and/or movies to be transmitted in accordance with the present invention.

FIG. 4 is an exemplary layout of a remote control that may be used to implement the present invention.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

With the recent advancement of digital technology, the way information flows and data are exchanged have taken a new direction. With the aid of video compression and decompression technology, digitized audio and video data can now be transmitted live across cities, states, and countries. Moreover, network bandwidth continues to increase through the introduction of fast Ethernet, cable modem, Digital Subscriber Line (DSL), variations of DSL (xDSL), and Gigabit Ethernet. DSL service enables the transmission of data at rates up to 6.1 megabits (millions of bits) per second, enabling continuous transmission of motion video, audio, and even 3-D effects. Accordingly, real-time video transmission which requires high bandwidth is now feasible.

Through the use of the present invention, files such as movies and karaoke videos may be downloaded to a local server and streamed to one or more client devices (e.g., set-top boxes). In addition, interactive control of the streamed data is made available through the set-top boxes. Accordingly, the present invention provides the traditional advantages of a conventional video recorder without the restrictions or limitations of a video recorder.

Figure 1:
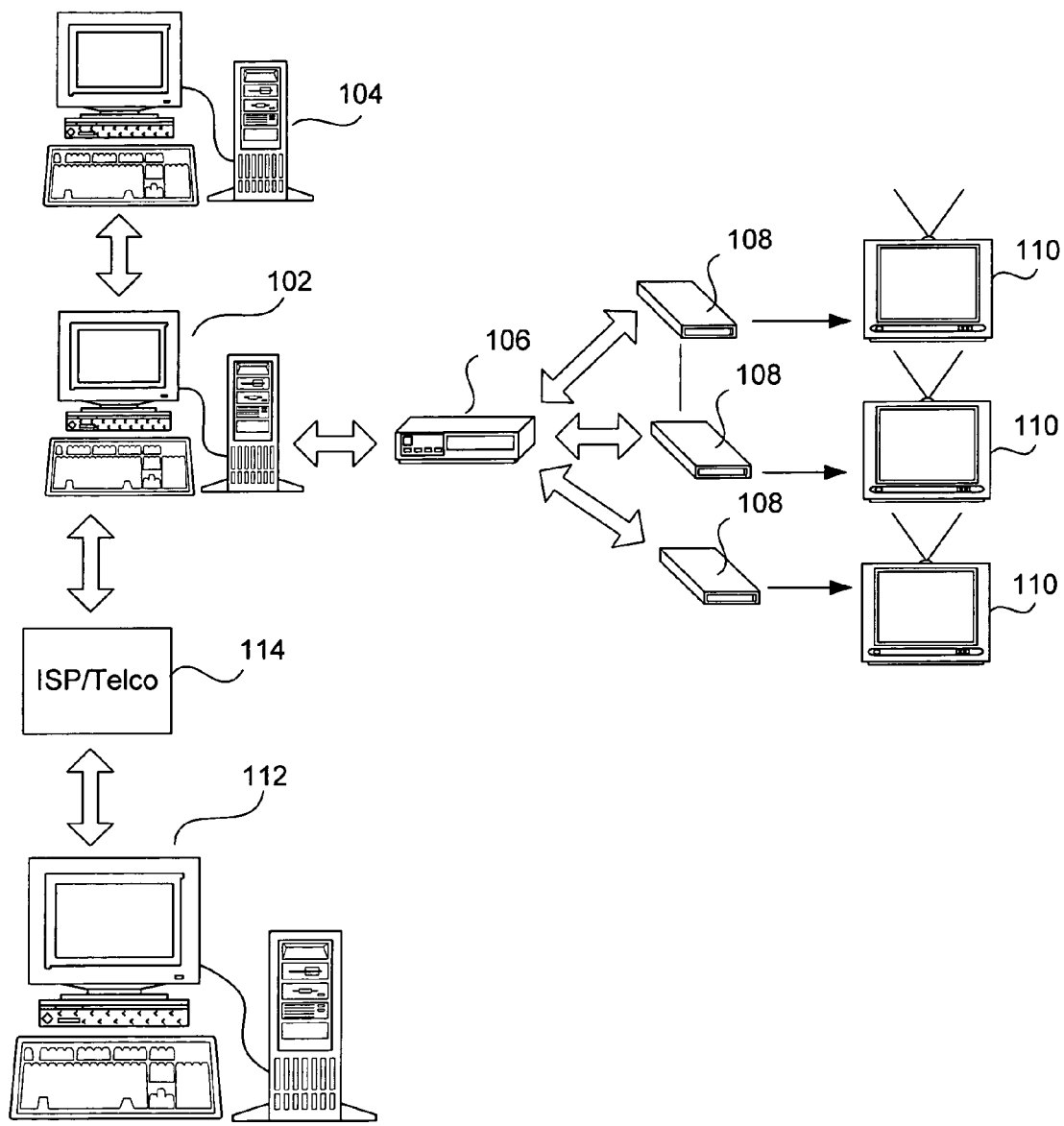
FIG. 1 is a block diagram illustrating an exemplary system in which the present invention may be implemented in accordance with an embodiment of the invention.

FIG. 1 is a block diagram illustrating an exemplary system in which the present invention may be implemented in accordance with an embodiment of the invention. The present invention is implemented in a network such as a local area network (LAN), which may be further coupled to a wide area network (WAN) such as the Internet. Within the network, one or more local servers 102 are used as the video-streaming server. Moreover, the local server(s) 102 may also be used as the content storage server that is capable of storing a plurality of files. One or more associated file servers 104 are used for user account management, content management, billing information, web server, firewall, and all other non-streaming related services. In addition, an equivalent central file server may be established at the central site which monitors and communicates with all the remote file servers. In order to decrease the costs associated with the local server 102 and limit the number of files available for transmission to each client, it may be preferable to use a suitable memory for storing approximately twenty files (e.g., karaoke files or movie files). However, this configuration is merely exemplary and a memory with a greater capacity may be implemented. These files may be supplied initially as well as downloaded from another server on the network, as well as from the Internet. The local server 102 is adapted for being coupled (e.g., via an Ethernet switch 106) to a plurality of devices 108 (e.g., set-top boxes) that are each configured to transmit a control command to the local server 102 to control the initiation and flow of data associated with a particular file to the requesting device 108. In addition, each of the devices 108 is capable of providing video and audio signals to associated monitors or televisions 110 when they are received from the local server 102.

Through each device 108, a client may initiate the transmission of data associated with a specified file via the local server 102. In addition, once transmission of data is initiated, it may be desirable to interactively control the transmission of data from the local server 102. When the requested file is not available to the local server 102, the local server may access a central server 112 over the Internet via an Internet Service Provider (ISP) 114. The central server 112 preferably has a vast data store of files in an associated memory. Alternatively, the client may independently download a requested file from the central server 112 via a web browser independently of transmission of the associated data to the client. For instance, when the user wants to watch a video that is not available on the local server, the user may access the central server and select one of a plurality of listed videos by clicking on the desired title(s). The central server 112 may then send the file to the local server 102 for storage in the file server 104 and/or transmission to a requesting client. It is important to note that each client device 108 and the local server 102 preferably perform authentication prior to establishing a communication link.

When a file is transmitted from the central server 112 to a client via the local server 102, the transmission and interactive control of the transmitted data may be performed in a manner to enable real-time streaming and therefore instantaneous access to the data by a requesting client. Alternatively, there may be a small or considerable delay, depending upon the transmission medium that is used. For instance, the transmission medium used to transmit data from the central server 112 to the local server 102, and from the local server 102 to each device 108 may include a traditional transmission medium such as a cable modem connection. In a WAN setting, bandwidth cannot be guaranteed at a sustainable rate to support real-time broad-band video streaming. Thus, it is important to note that the benefit of a the local server 102 in a LAN setting is to provide sustainable bandwidth to guarantee uninterrupted real-time video streaming.

Traditional phone service transmits an analog signal which is converted into digital information by a modem. However, the maximum amount of data that may be received using an ordinary modem is currently approximately 56 Kbps. In contrast, with various xDSL technologies, it is possible to receive data at rates of well over one million bits per second (Mbps), enabling continuous transmission of motion video, audio, and 3-D effects. For example, current ADSL standards contemplate data receive rates on the order of 6 Mbps. VDSL proposals contemplate data receive rates on the order of 25 or 50 Mbps. Thus, the delay involved in transmission of the requested data may be minimized through the use of a Digital Subscriber Line (DSL) or variations of DSL (xDSL). As a result, video quality is improved. Moreover, since multiple devices 108 may be coupled to the central server 112 through a single Digital Subscriber Line via the local server 102, each client need not individually obtain DSL service. In this manner, the cost to the consumer is considerably reduced while enabling the consumer to interactively control data transmission via the central server 112 with approximately instantaneous access.

The present invention may be used by a business such as a hotel to enable multiple rooms to access a local server maintained by the hotel. Since the local server is maintained by the hotel, the hotel may wish to bill a guest each time a movie or karaoke song is played (i.e., transmitted from the local server 102 to a client device 108). Moreover, the hotel may wish to bill the guest an additional amount when the requested selection is transmitted from the central server over the Internet to the guest's hotel room (e.g., when the user accesses the central server via a web browser). Of course, it may be desirable to bill a guest once (e.g., when the associated file is loaded from the central server to the local server) while allowing the guest to view the selection multiple times.

Billing information may be obtained in a variety of ways. For instance, billing information associated with the hotel room may be automatically obtained. As another example, billing information such as credit card information may be obtained from the user upon selection of a video. As yet another example, a smart card reader may be provided to enable the user to charge room services to his or her smart card.

As described above with reference to FIG. 1, multiple client devices 108 may be coupled to a single local server 102. In accordance with one embodiment of the invention, a client device 108 may be implemented in the form of a set-top box. A set-top box is a device that enables a television set to become a user interface to the Internet and also enables a television set to receive and decode digital television broadcasts. More particularly, a set-top box is used by television viewers to receive digital broadcasts via an analog television set. A set-top box typically includes a Web browser stored in a memory in the set-top box, enabling a television user to access the Internet. In addition, a typical digital set-top box contains one or more microprocessors for running the operating system and for parsing an MPEG transport stream. A set-top box also includes RAM, an MPEG decoder chip as well as other chips for audio decoding and processing. In addition, a set-top box may contain a hard drive for storing recorded television broadcasts, for downloaded software, and for other applications. Similarly, a DVD drive may be used to enable the set-top box to access a variety of files.

Figure 2:
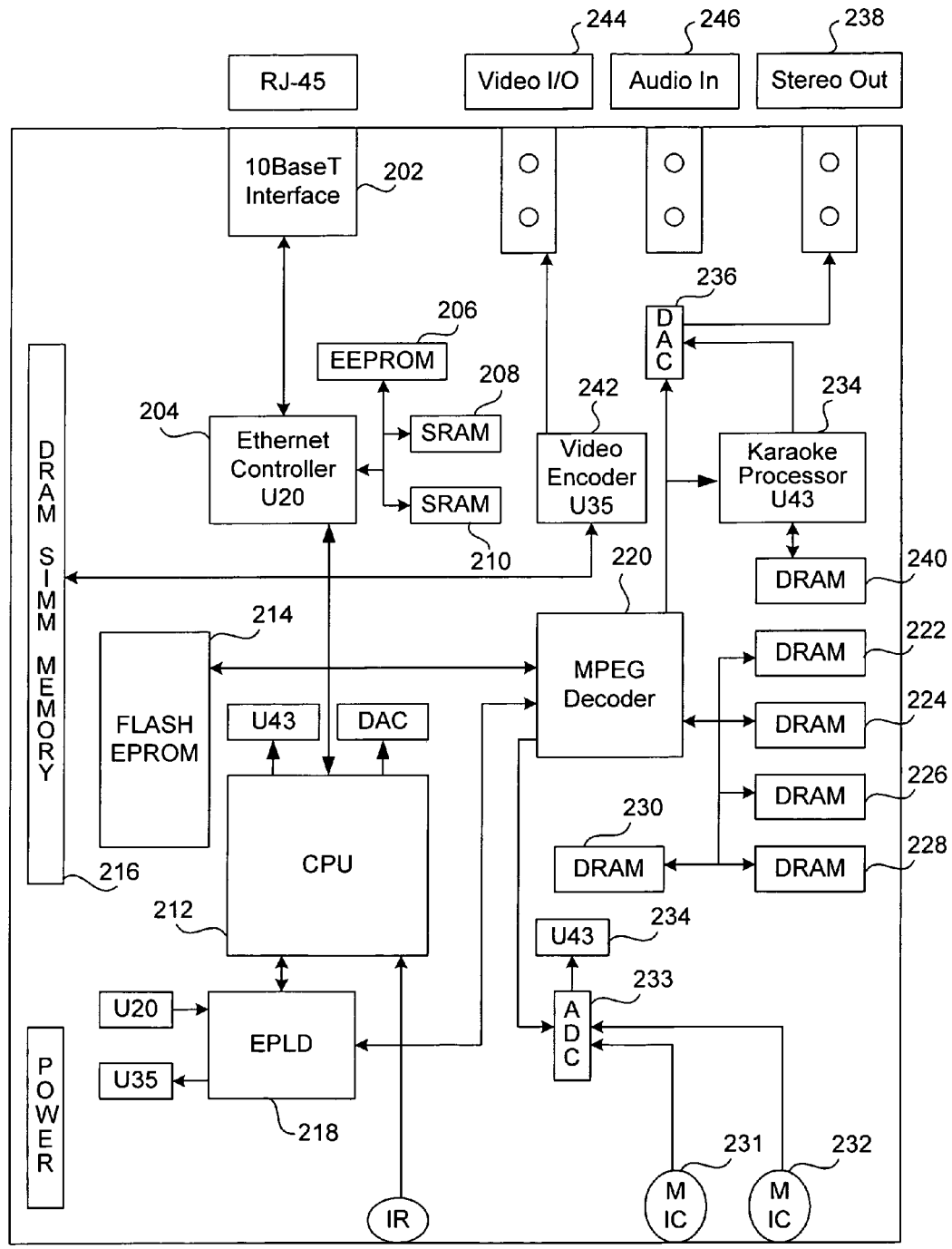
FIG. 2 is a block diagram illustrating an exemplary set-top box board layout that may be used to implement the present invention.

FIG. 2 is a block diagram illustrating an exemplary set-top box board layout that may be used to implement the present invention. In one embodiment, the set-top box board implements a standard Ethernet implementation and therefore includes a 10BaseT Interface 202, an Ethernet controller 204, an EEPROM 206 for storing an IP address associated with the set-top box board, and SRAMs 208, 210 for storing data obtained from the network (e.g., Internet). In addition, the set-top box includes a CPU 212 for running the operating system and for parsing an MPEG data stream. In addition, a flash EPROM 214 may store software for drivers and other instructions necessary to implement the present invention. Moreover, this client software that is programmed into the flash EPROM 214 may be updated through the local server at any time for feature enhancement. System memory 216 (e.g., DRAM) is available for use by the CPU. In addition, EPLD 218 is adapted for routing signals among components, thereby providing the appropriate combinational logic for the set-top box. MPEG decoder 220 is provided for decompressing video and audio data received in the compressed data received by the set-top box. DRAM chips 222, 224, 226, 228, and 230 are provided for storing video data for the MPEG decoder 220.

After the video and audio data is decompressed by the MPEG decoder 220, the decompressed audio and video signals are processed separately. The decompressed video signal is then sent from the MPEG decoder 220 to a video encoder 242 to convert the digital video signal to an analog signal. The analog video signal is then output at a video input/output 244. The decompressed audio signal is sent from the MPEG decoder 220 to digital-to-analog converter 236 and output via stereo output 238 and therefore through an amplifier (not shown).

In accordance with one embodiment, the set-top box includes karaoke capabilities. Thus, in addition to the data (e.g., karaoke file) received from the network, one or more microphone inputs 231 and 232 are provided to enable users to sing along with a karaoke selection. In the embodiment shown, two microphone inputs are supported, although it should be appreciated that any desired number of microphones may be provided. When a karaoke singer sings into a microphone, the audio signal is processed by an analog to digital converter 233. The digital audio signal is then sent to a karaoke audio processor 234. For instance, the karaoke audio processor 234 may be a digital karaoke audio processor such as model MED25102 available from Medianix Semiconductor, Inc., located at 100 View Street, Mountain View, Calif. 94041. The digital audio signal processed by the karaoke processor 234 is then sent to digital-to-analog converter 236 and output via stereo output 238. In addition, a DRAM chip 240 is available for storing audio data for the karaoke processor 234. A standard audio input 246 is also provided. In addition, an infra-red interface controller (not shown) may be provided to enable communication with a remote control device.

In accordance with one embodiment, the set-top box is capable of switching between NTSC and PAL signals for world-wide adoption and compatibility. In addition, to implement a karaoke system, user interfaces in different languages may be provided by the set-top box. Similarly, files encoded with sound tracks in multiple languages may be provided at the local server to enable a sound track in a particular language to be selected at the set-top box.

FIG. 3A is an exemplary screen shot that may be presented to a user upon start-up. As shown, an initial screen 302 may be displayed which indicates one or more selections which may be input by a user. For instance, at start-up, a default selection type 304 may be presented to the user. More particularly, the selection type 304 of a file to be transmitted may be, for example, "karaoke" or "movie". Thus, the default selection type 304 may be "karaoke", as shown. In addition, the user may indicate a particular selection 306 associated with the selection type 304. As shown, a number, title, or other mechanism may be used to identify each selection.

FIG. 3B is an exemplary screen shot illustrating the selection of karaoke songs and/or movies to be transmitted in accordance with the present invention. Once the user has entered one or more selections, a TV screen or monitor 308 after all selections are entered is displayed. Thus, the selection type 310 may be "movie" or "karaoke", as shown. In addition, each selection 312 is identified numerically in accordance with a pre-selected set of selections available to the user. For instance, a manual may be provided to the user identifying the selections available to the user.

As described above, the user sends control commands to the set-top box indicating desired modifications to the flow of data to the set-top box. In accordance with one embodiment, these control commands are sent to the set-top box via an infra-red remote control. FIG. 4 is an exemplary layout of a remote control that may be used to implement the present invention. A TV/VIDEO key 402 enables a user to toggle between a television and video mode. In addition, a NEXT key 404 stops the current video (e.g., movie or karaoke) and starts the next video selected. An ENTER key 406 enables a user to enter a number of key strokes. In addition, an NTSC/PAL key 408 enables a user to switch between NTSC and PAL mode, as described above. A RESET key 410 reboots the set-top box. A VIEW/MENU key 412 enables a user to view a video after all karaoke or movie selections are entered. During video play, when the VIEW/MENU key 412 is toggled, a menu screen is displayed to enable the user to add or edit the video selections. The user may then toggle the VIEW/MENU key 412 an additional time to start playing the current video selection. Number keys 0–9 413–430 may be used to identify video titles. Arrow keys 432–438 move the cursor up, down, right or left to enable a user to enter or modify selections.

Various control keys are provided to initiate or modify the flow of data to the set-top box. When a PLAY key 440 is pressed, a selected video (e.g., movie or karaoke selection) is played at normal speed from either a PAUSE, STEP, or SLOW mode, each of which will be described in further detail below. In addition, in accordance with one embodiment, a percent video played indicator is displayed on the screen to indicate the amount of the video that remains to be transmitted. When a SLOW key 442 is pressed, the video speed is slowed (e.g., to one-half normal speed). The PLAY key 440 may then be pressed to resume to normal speed. Similarly, when a PAUSE key 444 is pressed, the video is paused until the PLAY key 440, the SLOW key 442, or a STEP key 446 is pressed. Once the STEP key 446 is pressed, the video is advanced by one frame at a time.

Rather than viewing the entire video, the user may wish to view only specific portions of the video. When a SEEK key 448 is pressed during video play, the user may select a percentage of the video file to jump to. The video then jumps to that location and begins to play starting from that location. The seek location may be any location in the video file. Accordingly, the seek function may operate in forward or reverse.

In addition to video control keys described above, karaoke control keys are provided to enable the user to modify the audio signal associated with the karaoke music and/or the user's voice. The key functions may be implemented through the use of a conventional karaoke audio processor such as karaoke audio processor MED25102 available from Medianix. Various keys are provided on the remote control to implement various functions available in a karaoke processor. For instance, KEY−450 decreases the key of the music, KEY+452 increases the key of the music, KEY N 454 returns the key of the music to neutral, VOL+ 456 increases the microphone volume, VOL−458 decreases the microphone volume, ECHO+460 increases microphone echo, and ECHO−462 decreases microphone echo. When FADER 464 key is pressed, the vocal portion of the music is silenced. PITCH 466 changes the pitch of the karaoke singer's voice that is received through the microphone by shifting the pitch one semi-note with each depression. HARMONY 468 adds a pitch-shifted and a non pitch-shifted microphone signal to create the sound of two vocalists. MUTE 470 mutes the associated microphone.

As described above with reference to FIG. 4, a remote control may enable a user to modify the flow of data to a set-top box. However, other input devices may be used. For instance, such input devices include, but are not limited to, a keyboard or a mouse.

Through the use of the present invention, data may be transmitted from a particular network device to a requesting network device. In accordance with one embodiment, data is transmitted to a set-top box from a local server. Of course, when a particular file is not directly accessible by the local server, the file may be downloaded from a central server (e.g., to a file server associated with the local server). In addition, data may be transmitted from the central server via the local server. The downloading and/or transmission from the central server to the local server may be initiated by the user (e.g., via a web browser) or by the local server when the file cannot be directly accessed by the local server. Once data flow associated with a file is initiated, the data flow may be modified through the sending of various control commands by the user (e.g., via an infra-red remote control). In accordance with one embodiment, data flow from the local server may be modified by the user. The flow of data and modification of the data flow from the local server will be described in further detail below with reference to FIG. 5 through FIG. 14. However, it will be understood that the flow of data and modification of the data flow may also be performed via the central server.

Figure 5:
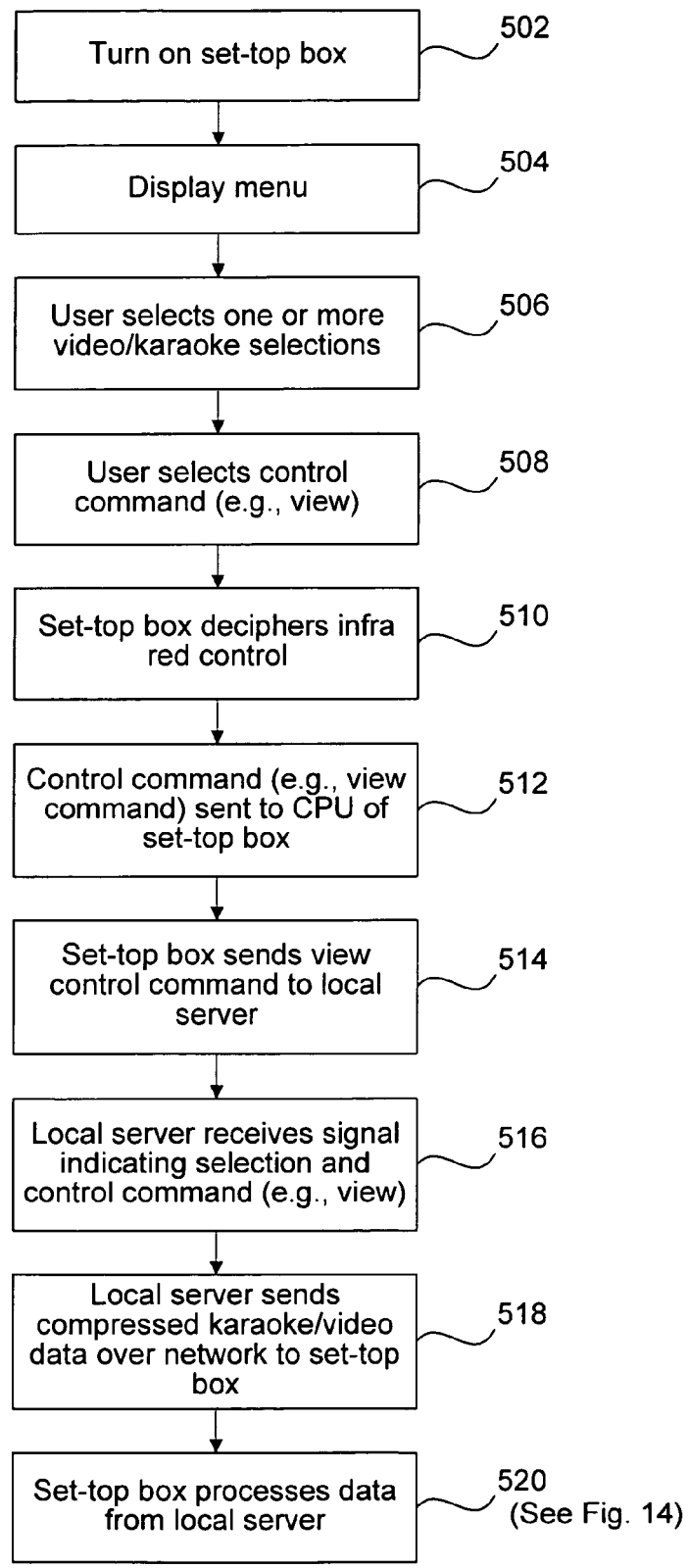
FIG. 5 is a process flow diagram illustrating a method of playing a movie or karaoke selection in accordance with an embodiment of the invention.

FIG. 5 is a process flow diagram illustrating a method of playing a movie or karaoke selection in accordance with an embodiment of the invention. When the set-top box is turned on at block 502, a menu is displayed at block 504. For instance, a screen such as that illustrated in FIG. 3A may be displayed to enable a user to enter one or more karaoke or movie selections as shown in FIG. 3B. The user enters one or more selections at block 506 to indicate those movies, karaoke selections or other video files to be transmitted to the set-top box. The user then selects a control command at block 508 to initiate, terminate or otherwise modify the flow of data to the set-top box. Thus, the control command generally indicates a desired modification of the flow of data to the set-top box. More particularly, this may be accomplished by pressing a key on a remote control such as that described above with reference to FIG. 4. For instance, the user may select the VIEW command in order to view a selected video.

When the control command (e.g., view command) is received by the set-top box at block 510, the set-top box deciphers the infra red control signal and sends the control command to a CPU of the set-top box at block 512. The set-top box then sends the control command to the local server at block 514. The local server receives the control command at block 516. In addition, the local server may receive a signal indicating a current video selection. The local server then sends a compressed data stream over a network to the set-top box at block 518. More particularly, the compressed data stream may include audio, video and other digital data. The set-top box then processes the data received from the local server at block 520. One method of processing the data by the set-top box is described in further detail below with reference to FIG. 14.

Figure 6:
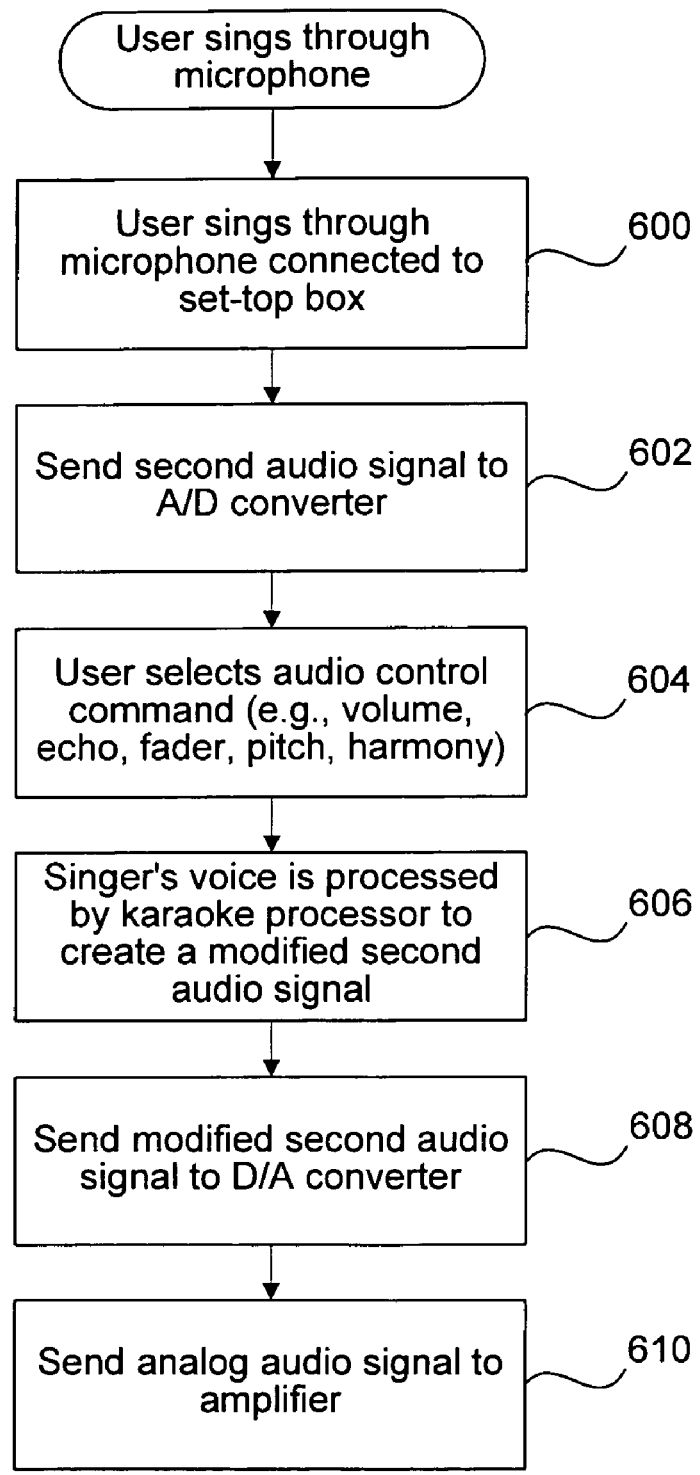
FIG. 6 is a process flow diagram illustrating a method of processing a user's voice input in accordance with an embodiment of the invention.

In accordance with one embodiment, the user may initiate and modify the transmission of karaoke data from a server to the set-top box. Thus, a first audio signal is received by the set-top box from a server and processed, as will be described below with reference to FIG. 14. In addition, the user may sing along with the karaoke selection through a microphone, creating a second audio signal. FIG. 6 is a process flow diagram illustrating a method of processing a user's voice input in accordance with an embodiment of the invention. More particularly, when a user sings through a microphone connected to the set-top box at block 600, the audio signal is processed by an analog to digital converter at block 602. In addition, the user may select an audio control command as shown at block 604 via a karaoke control key as described above with reference to FIG. 4 to modify the audio signal that is ultimately produced by the set-top box. For instance, the user may wish to adjust the volume or pitch. The singer's voice is then processed by the karaoke processor at block 606 to modify the second audio signal. This modified second audio signal is then sent to a digital to analog converter at block 608. The resulting analog audio signal is then sent to an amplifier at block 610.

The flow of data to the set-top box may be modified in a variety of ways. As described above with reference to FIG. 4, the flow of data may be modified in a variety of ways. For instance, the user may wish to pause a video, or press a remote control key such as STEP, SLOW, PLAY, MENU, NEXT, or SEEK. Exemplary process flow diagrams illustrating such possible modifications to the flow of data to a set-top box will be described in further detail below with reference to FIG. 7 through FIG. 13.

Figure 7:
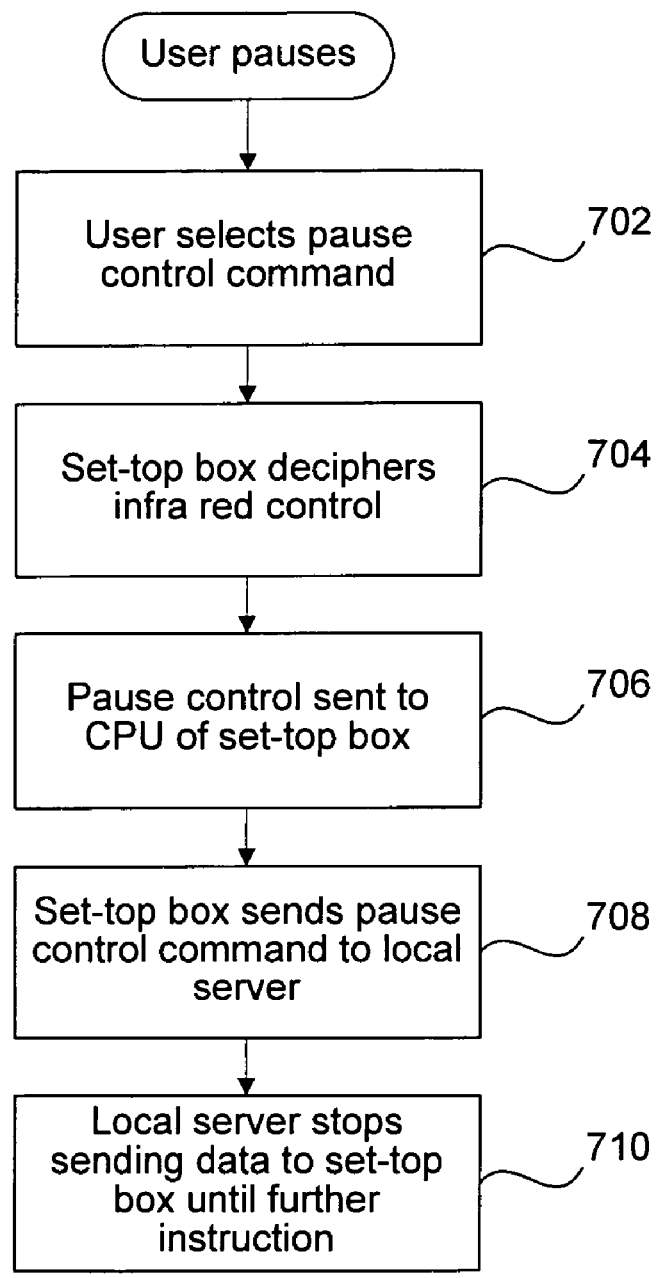
FIG. 7 is a process flow diagram illustrating a method of pausing a movie or karaoke selection in accordance with an embodiment of the invention.

When a user wishes to pause the transmission of data to the set-top box, the user may press the PAUSE button on the remote control. FIG. 7 is a process flow diagram illustrating a method of pausing a movie or karaoke selection in accordance with an embodiment of the invention. As shown, when a user selects a pause control command at block 702, the set-top box deciphers the infra-red control at block 704. The pause control command is then sent to a CPU of the set-top box at block 706. The set-top box sends the pause control command to the local server at block 708. In response, as shown at block 710, the local server stops sending data to the set-top box until further instruction.

Figure 8:
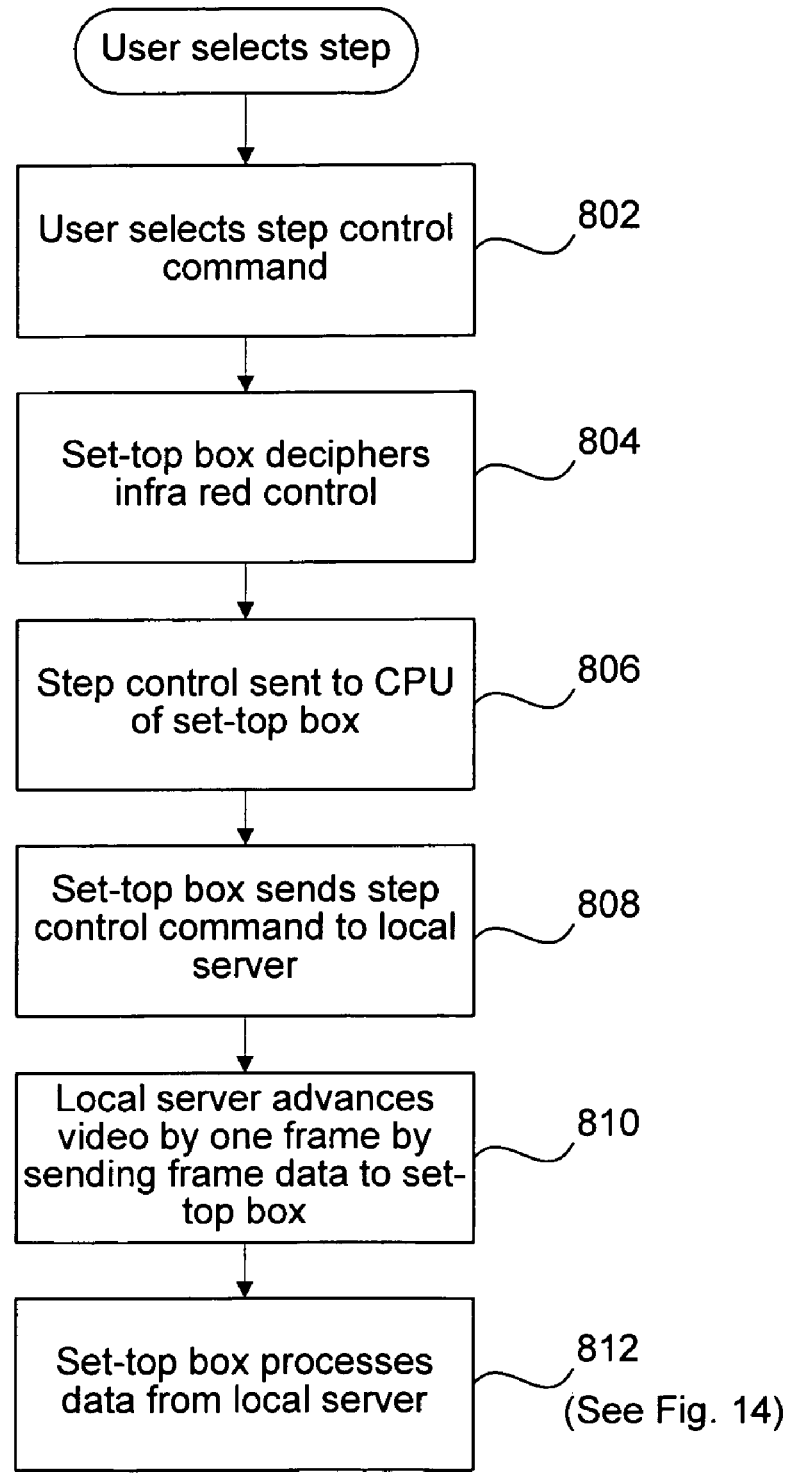
FIG. 8 is a process flow diagram illustrating one method of stepping transmission of data in accordance with an embodiment of the invention.

A user may press the STEP key when he or she wishes to step the transmission of data (e.g., by a single frame). FIG. 8 is a process flow diagram illustrating one method of stepping transmission of data in accordance with an embodiment of the invention. As shown at block 802, a user may select the step control command through pressing the STEP key on a remote control. When the infra red signal is received by the set-top box, the set-top box deciphers the infra red signal at block 804 and sends a step control command to a CPU of the set-top box at block 806. The set-top box (e.g., CPU) then transmits this step control command to the local server at block 808. In response, the local server advances the appropriate video by a frame by sending data associated with that frame to the set-top box at block 810. The set-top box then processes the data received from the local server at block 812, as will be described in further detail below with reference to FIG. 14.

Figure 9:
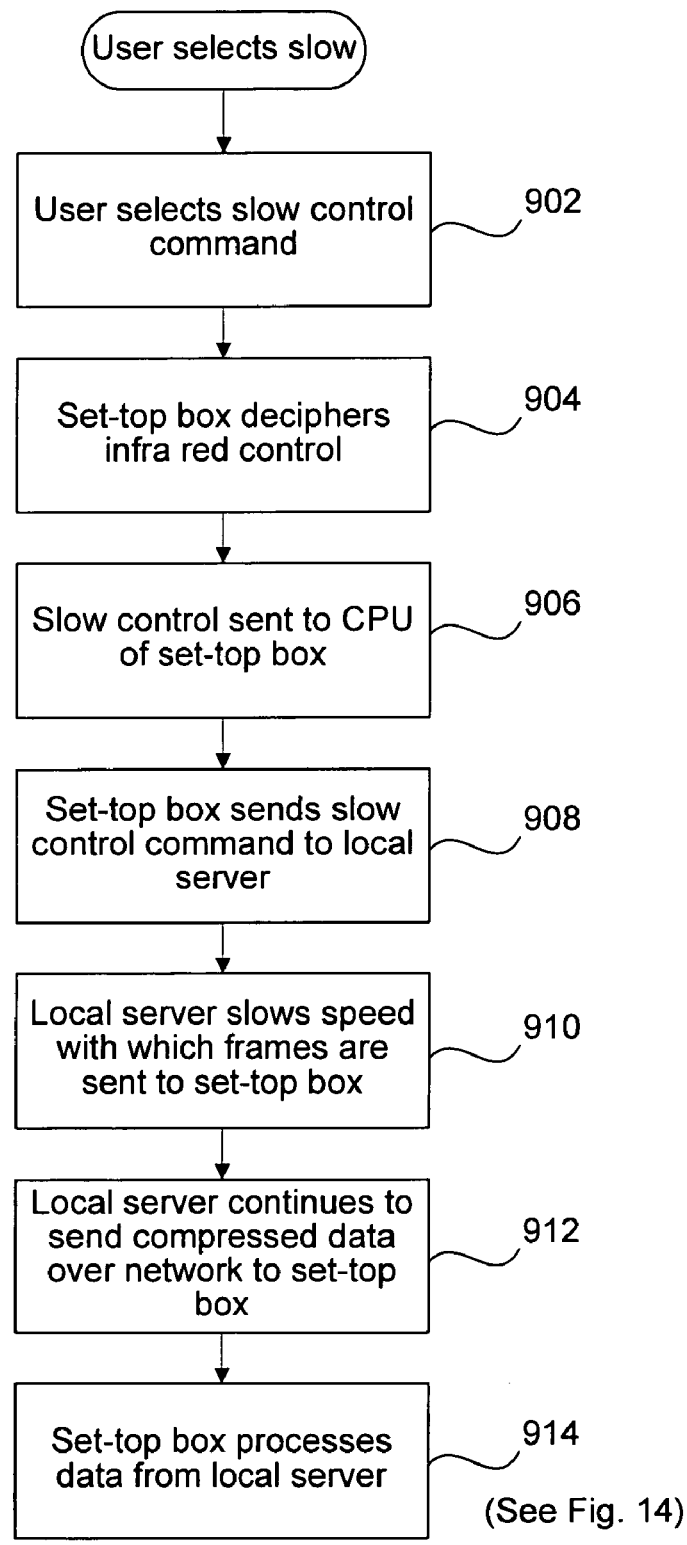
FIG. 9 is a process flow diagram illustrating one method of reducing the speed of data transmission to the set-top box in accordance with one embodiment of the invention.

A user may similarly wish to modify the speed of transmission of data to the set-top box over the network. For instance, the user may wish to reduce as well as increase the speed of data transmission. FIG. 9 is a process flow diagram illustrating one method of reducing the speed of data transmission to the set-top box in accordance with one embodiment of the invention. When a user wishes to slow the speed of data transmission, the user may press a SLOW key on a remote control as shown at block 902, as described above with reference to FIG. 4. The set-top box deciphers the infra red control at block 904 and a slow control command indicating that the data transmission is to be slowed is sent to a CPU of the set-top box at block 906. The set-top box then sends the slow control command to the local server at block 908. In response to the control command, the local server reduces the speed with which data (e.g., frames) are sent to the set-top box at block 910. The local server then continues to send compressed data over the network to the set-top box at block 912. The set-top box then processes the data received from the local server at block 914, which will be described in further detail below with reference to FIG. 14.

Figure 10:
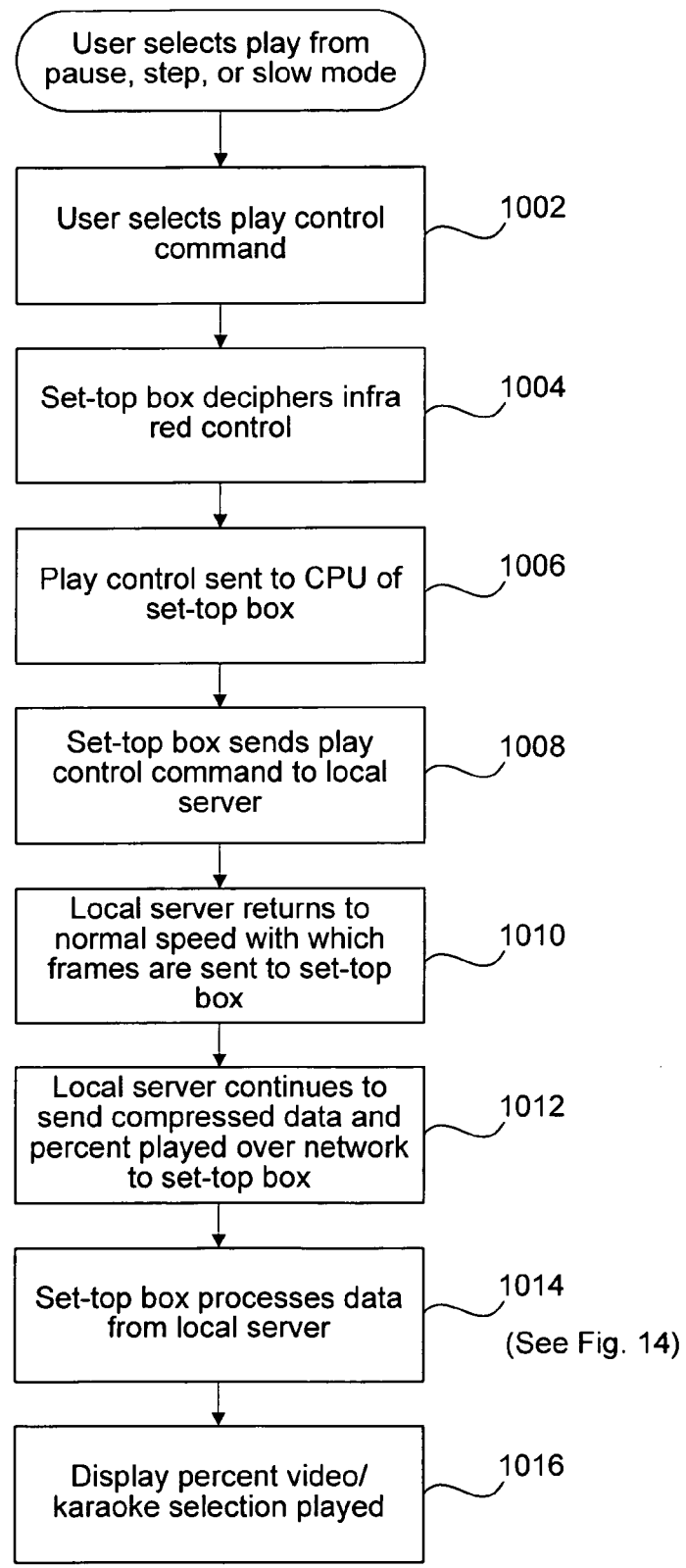
FIG. 10 is a process flow diagram illustrating a method of initiating or resuming the transmission of data in accordance with one embodiment of the invention.

The user may also wish to initiate the transmission of data over the network to the set-top box (e.g., from a pause mode). Alternatively, the user may wish to resume transmission of data to a normal speed from a step or slow mode. FIG. 10 is a process flow diagram illustrating a method of initiating or resuming the transmission of data in accordance with one embodiment of the invention. As shown at block 1002, the user may select the play control command at block 1002. This may be accomplished through pressing the PLAY key on a remote control such as that illustrated in FIG. 4. For instance, the PLAY key may be pressed from the pause, step, or slow mode. The set-top box then deciphers the infra red control at block 1004 and a play control command indicating that initiation of the transmission of data is requested is sent to a CPU of the set-top box at block 1006. The set-top box then sends the play control command to the local server at block 1008. The local server then initiates the transmission of data at block 1010. More particularly, the local server may initiate the transmission of data or simply return to normal speed with which data is sent to the set-top box. The local server continues to send compressed data over the network to the set-top box at block 1012. In addition, in accordance with one embodiment, the local server sends a percentage value indicating a percent of the file that has been transmitted (e.g., percent of a movie that has been played over the network). The set-top box processes the data it receives from the local server at block 1014, as will be described in further detail below with reference to FIG. 14. The set-top box further displays the percent of the selection that has been transmitted to the set-top box and therefore played for the user at block 1016. As described above, the data may be associated with any file, such as a movie or karaoke selection.

The user may wish to edit his or her selections that have been previously entered via a screen such as that illustrated in FIG. 3A and FIG. 3B. In this manner, the user may specify via the set-top box an order of transmission of one or more files. The files may be of varying types, such as those storing movies or karaoke videos. It is important to note that the files being selected are not stored locally at the set-top box, but identify files stored in association with a remotely located server on the network.

Figure 11:
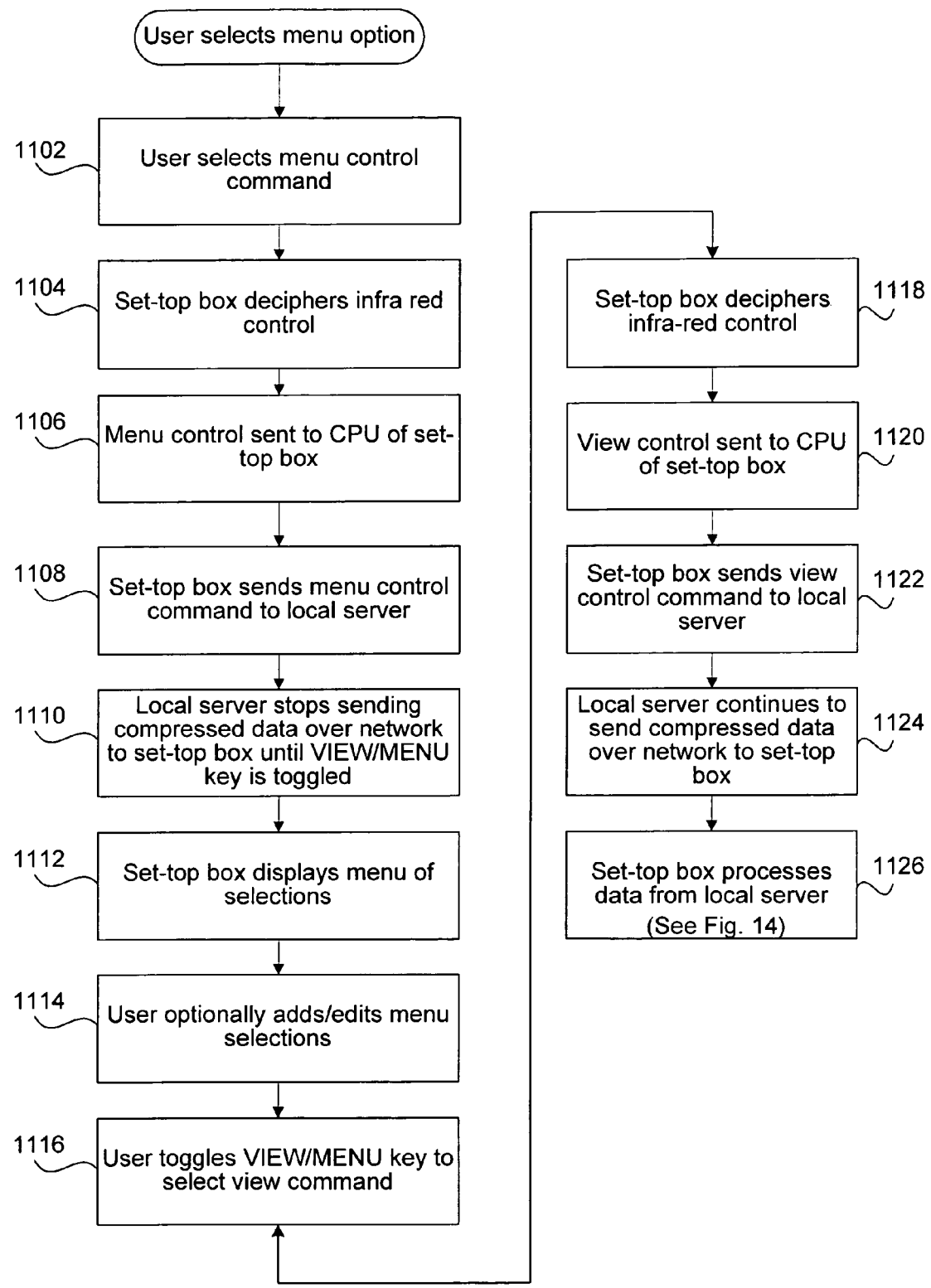
FIG. 11 is a process flow diagram illustrating a method of selecting data files to be transmitted via a menu in accordance with one embodiment of the invention.

FIG. 11 is a process flow diagram illustrating a method of selecting data files to be transmitted via a menu in accordance with one embodiment of the invention. As shown, the user may select a menu control command at block 1102 which sends an infra red signal to the set-top box. The set-top box deciphers the infra red control at block 1104 and sends this menu control command to a CPU of the set-top box at block 1106. The set-top box sends this menu control command over the network to the local server at block 1108. The local server then stops sending compressed data over the network to the set-top box at block 1110. For instance, the local server may stop sending data until a VIEW/MENU key on a remote control such as that illustrated in FIG. 4 is toggled by the user.

The set-top box then displays a menu of selections at block 1112. As one example, the menu may present the user with a number of possible files (e.g., movie or karaoke) to be transmitted to the set-top box. As another example, the menu may simply be a screen such as that presented in FIG. 3A which may enable a user to enter as well as modify his or her selections as illustrated in FIG. 3B. When presented with this menu, the user may add as well as edit the menu selections that are displayed at block 1114. As one example, the user may have be presented with a screen illustrating a single previously entered selection. The user may then enter or select additional selections up to a maximum number of permissible selections. As another example, the menu may present the user with a number of selections previously selected by the user. The user may then modify one or more of these selections.

When the user decides to view one or more of his selections, the view control command may be selected by again toggling the VIEW/MENU key at block 1116. The set-top box deciphers the infra-red control at block 1118 and a view control command is sent to a CPU of the set-top box at block 1120. The set-top box sends the view control command over the network to the local server at block 1122. For instance, the view control command may identify one or more files to be transmitted over the network. In addition, the view control command may also indicate the order of transmission of those files. Of course, the view control command may also designate a starting point from which compressed data is to be transmitted. The starting point may indicate a specific file as well as a location (e.g., percentage) within that file. The local server then resumes sending compressed data over the network to the set-top box at block 1124. The set-top box then processes the data it receives at block 1126, which will be described in further detail below with reference to FIG. 14.

Figure 12:
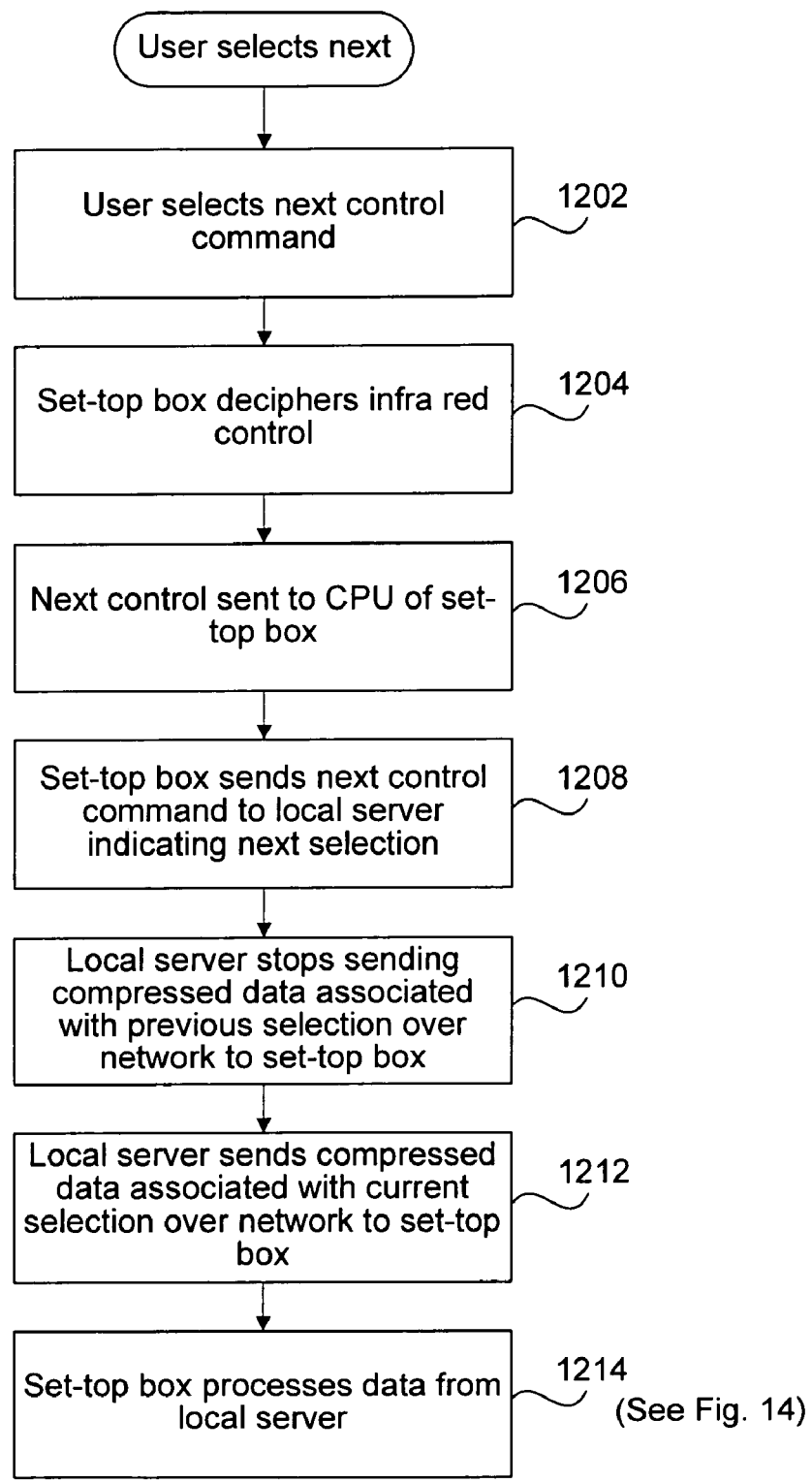
FIG. 12 is a process flow diagram illustrating one method of initiating the transmission of data associated with a next selected video in accordance with one embodiment of the invention.

Rather than allowing all selections to play consecutively, the user may wish to terminate a current video and start the next selected video. FIG. 12 is a process flow diagram illustrating one method of initiating the transmission of data associated with a next selected video in accordance with one embodiment of the invention. When the user wishes to stop the transmission of data associated with a first video and start the transmission of data associated with a second video, the user may select the next control command at block 1202 by pressing the NEXT key on a remote control such as that illustrated in FIG. 4. The set-top box deciphers the infra red control at block 1204. A next control command indicating that a next video is selected is then sent to a CPU of the set-top box at block 1206. The set-top box sends the next control command to the local server indicating that the next video is selected as shown at block 1208. For instance, the next control command may directly or indirectly identify a currently selected video. At block 1210 the local server stops sending compressed data associated with the previous selection over the network to the set-top box. The local server then sends compressed data associated with the current selection over the network to the set-top box at block 1212. The set-top box then processes the data it receives from the local server at block 1214. One method of processing the compressed data will be described in further detail below with reference to FIG. 14.

Figure 13:
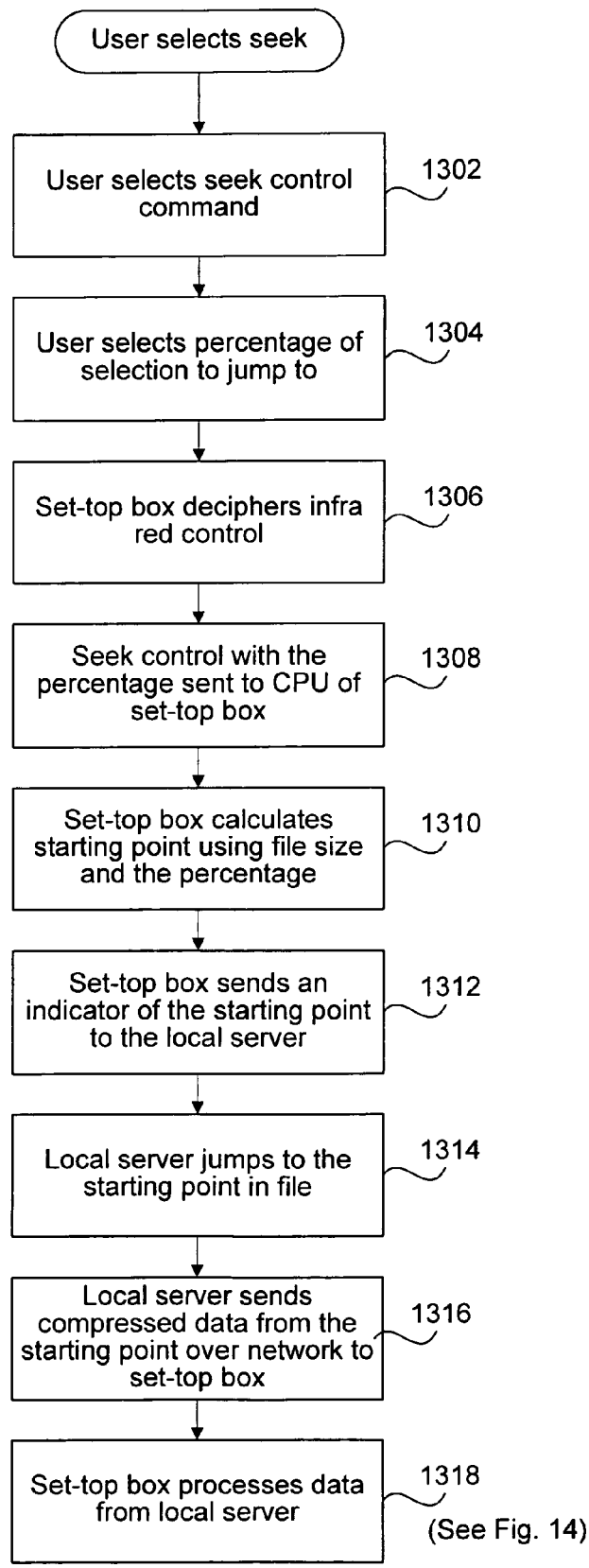
FIG. 13 is a process flow diagram illustrating a method of performing a seek in accordance with an embodiment of the invention.

When a user wishes to initiate transmission of data from a particular location in a file, the user may press the SEEK key of a remote control such as that illustrated in FIG. 4. FIG. 13 is a process flow diagram illustrating a method of performing a seek in accordance with an embodiment of the invention. As shown at block 1302 the user may select the seek control command by pressing the SEEK key of a remote control at block 1302. In addition, the user indicates a location in the video file from which data transmission is desired at block 1304. In accordance with one embodiment, the user selects a percentage of a video file that has been transmitted. The set-top box deciphers the infra red control at block 1306 and the corresponding seek control command indicating the desired percentage is sent to a CPU of the set-top box at block 1308.

In accordance with one embodiment, the starting point in the file from which data is to be transmitted is calculated by the set-top box. More particularly, when the file is initially selected, the local server sends information associated with the file such as the size of the file to the set-top box. For instance, when an MPEG file is transmitted, file information is transmitted in the initial packets that are transmitted. The set-top box uses the size of the file and the percentage to determine a starting point in the file at block 1310. The set-top box then sends an indicator of the desired file location to the local server at block 1312.

Alternatively, the calculation of the starting point may be performed by the local server. In accordance with this embodiment, the set-top box sends the seek control command indicating the desired percentage over the network to the local server at block 1310. When the local server receives the seek control command, the local server uses the size of the file and the percentage to determine a starting point in the file at block 1312.

The local server then "jumps" to this starting point in the file at block 1314 and initiates the transmission of compressed data from the starting point over the network to the set-top box at block 1316. The set-top box then processes the data it receives from the local server at block 1318, which will be described in further detail below with reference to FIG. 14.

Figure 14:
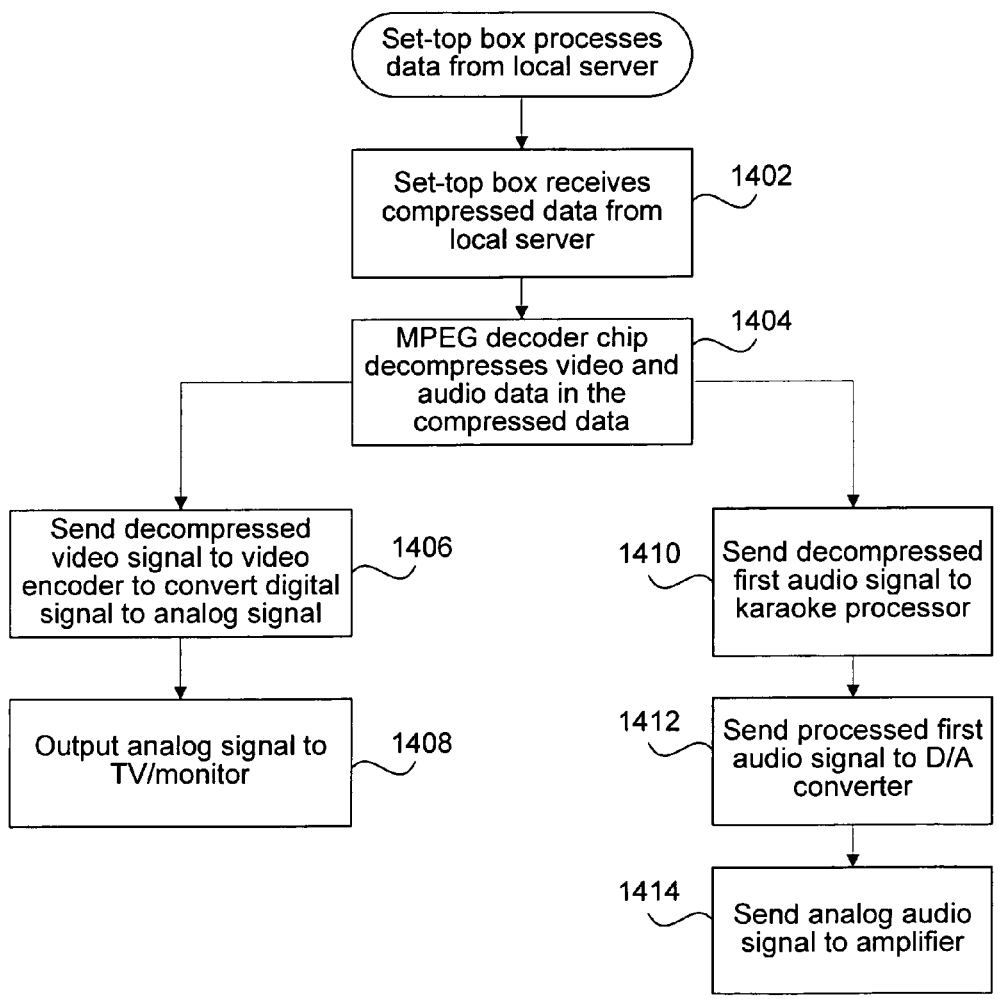
FIG. 14 is a process flow diagram illustrating one method of processing data received by the set-top box in accordance with one embodiment of the invention.

As described above, when the set-top box receives compressed data sent over the network, the set-top box processes this data. FIG. 14 is a process flow diagram illustrating one method of processing data received by the set-top box in accordance with one embodiment of the invention. A variety of commands sent by the set-top box result in compressed video data being sent to a requesting client (e.g., set-top box). When the client sends a request to a server asking the server to send compressed video data to the client, the server splits the associated compressed video data file (or portion thereof) into multiple packets and sends the packets to the client. As shown at block 1402 the set-top box receives the compressed video data from the local server. An MPEG decoder chip then decompresses video and audio data in the compressed data at block 1404. The decompressed video signal is then sent to a video encoder to convert the digital signal to an analog signal at block 1406. The resulting analog signal is then output to a television or monitor at block 1408. The data received by the set-top box may be stored for future use. However, it may be desirable to delete the data once it is provided by the set-top box to the user. In this manner, a video may be displayed in real-time onto a television screen.

In addition to the decompressed video data, the decompressed audio data is also processed by the set-top box. More particularly, in accordance with the karaoke embodiment, the decompressed audio signal is sent to the karaoke processor at block 1410. The processed audio signal is then sent to a digital to analog converter at block 1412. The resulting analog audio signal is then sent to an amplifier at block 1414.

When data is transmitted from the central server to the set-top box via a local server, the local server may store a copy of this data (e.g., in an associated file server). Alternatively, it may be desirable to erase this copy once the data is transmitted to a requesting set-top box.

The present invention may be used in a variety of environments. For instance, the above-described system may be configured as a networked karaoke system to enable a plurality of rooms to access karaoke songs concurrently without the intervention of a human operator. The present invention may also be used to provide hotels a cost-effective solution to deliver movies to hotel guests. Moreover, it may also be useful in hospitals to enable bed-ridden patients to watch movies or surf the Internet. Schools may also implement the present invention within a campus local area network to transmit video-taped lectures or other presentations. Additionally, long trips in a confined seat takes a toll on passengers in a common carrier such as an airplane, cruise ship, train or bus. Thus, the present invention may allow each passenger to watch and control a movie he or she is interested in throughout the entire trip. It may also be desirable to implement the present invention within an apartment complex to enable the system as well as system costs to be shared by each residential unit. Additionally, the present invention may be deployed as a video kiosk in airports, train stations, hotel lobbies, department stores, conventions, or museums for information, catalog or advertisement purposes.

The emergence of the Internet has created a world-wide data network. As Internet traffic grows steadily, the data highway's bandwidth increases accordingly. This presents a major opportunity for a new class of dedicated communication devices that will allow users to conduct communication (e.g., via voice and video data) through the data network. This information exchange has evolved from text-based to graphics-based to content-rich, video-based communications capable of providing a multitude of services. Accordingly, the present invention may be implemented in a device or web browser to provide interactive, real-time, high-bandwidth services to a user using the Internet.

As described above, the present invention enables a client device such as a set-top box to receive data streams such as video streams that are transported over a network from a video server. In addition, the set-top box might output information to the network in the course of performing the above-described method steps. Such information may be received from and outputted to the network, for example, in the form of a computer data signal embodied in a carrier wave. The network may also be a wireless network.

Through the use of the present invention, video, audio, and karaoke functionality are integrated in a single system capable of interfacing to a standard television. Since the present invention is implemented in a set-top box, it is compact and portable. Moreover, since a computer system is not required, the present invention may be manufactured at a relatively low cost to the consumer.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as transmitting data from a local server within the context of a digital television receiver. However, the present invention may be used in other contexts, such as through transmitting data from another server (e.g., central server) via the local server. For instance, the present invention may permit access to a central server on the Internet. Similarly, the present invention may be implemented across a plurality of staged servers, enabling information to be transmitted across the Internet. Moreover, the above described process blocks are illustrative only. Therefore, the present invention may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. In a first network including a local server coupled to a central server, the local server being coupled to a plurality of network devices via a second network, a method of interactively controlling from one of the plurality of network devices a flow of audio visual data from the central server to the network device, the method comprising:
    obtaining a control command at the network device, the control command indicating a desired modification to the flow of the audio visual data from the central server to the network device;
    sending the control command from the network device to the local server via the second network;
    sending the control command from the local server to the central server via the first network; and
    receiving a modified flow of the audio visual data from the central server at the network device in response to the control command such that the network device interactively modifies the flow of audio visual data from the central server to the network device.

2. The method as recited in claim 1, wherein the first network is the Internet.

3. The method as recited in claim 1, wherein the first network is a wide area network and the second network is a local area network.

4. The method as recited in claim 1, wherein each of the plurality of network devices is coupled to the local server via a switch.

5. The method as recited in claim 4, wherein each of the plurality of network devices is a set-top box.

6. The method as recited in claim 1, wherein the second network is a wireless local area network.

7. In a first network including a local server coupled to a central server, the local server being coupled to a plurality of network devices via a second network, a method of interactively controlling from one of the plurality of network devices a flow of audio visual data from the central server to the network device, the method comprising:
    obtaining a control command at the network device, the control command indicating a desired modification to the flow of the audio visual data from the central server to the network device;
    sending the control command from the network device to the local server via the second network;
    sending the control command from the local server to the central server via the first network; and
    modifying the flow of the audio visual data from the central server to the network device in response to the control command such that the network device interactively controls the flow of audio visual data from the central server to the network device.

8. The method as recited in claim 7, wherein modifying the flow of the audio visual data from the central server to the network device in response to the control command comprises:
    modifying the flow of the audio visual data from the central server via the first network to the local server; and
    when modifying the flow of the audio visual data from the central server to the local server includes sending a compressed audio visual data stream to the local server, sending the compressed audio visual data stream from the local server to the network device via the second network.

9. The method as recited in claim 8, further comprising:
    prior to sending the compressed audio visual data stream to the network device, storing the compressed audio visual data stream in a memory associated with the local server.

10. The method as recited in claim 8, wherein sending the compressed audio visual data stream to the network device is performed in real time.

11. The method as recited in claim 7, wherein the first network is the Internet.

12. The method as recited in claim 7, wherein the first network is a wide area network and the second network is a local area network.

13. The method as recited in claim 7, wherein each of the plurality of network devices is coupled to the local server via a switch.

14. The method as recited in claim 13, wherein each of the plurality of network devices is a set-top box.

15. The method as recited in claim 7, wherein the second network is a wireless local area network.

16. The method as recited in claim 7, wherein modifying the flow of the audio visual data from the central server to the network device in response to the control command such that the network device interactively controls the flow of audio visual data from the central server to the network device comprises:
    modifying a speed of flow of the audio visual data.

17. The method as recited in claim 16, wherein modifying a speed of flow of the audio visual data comprises increasing or reducing the speed of flow of the audio visual data.

18. The method as recited in claim 7, wherein modifying the flow of the audio visual data from the central server to the network device in response to the control command such that the network device interactively controls the flow of audio visual data from the central server to the network device comprises:
    stopping or pausing the flow of the audio visual data.

19. The method as recited in claim 7, wherein modifying the flow of the audio visual data from the central server to the network device in response to the control command such that the network device interactively controls the flow of audio visual data from the central server to the network device comprises:
    continuing the flow of the audio visual data at a point where the flow of the audio visual data was previously paused.

20. The method as recited in claim 7, wherein modifying the flow of the audio visual data from the central server to the network device in response to the control command such that the network device interactively controls the flow of audio visual data from the central server to the network device comprises:

initiating the flow of the audio visual data associated with a file identified by the control command.

21. The method as recited in claim 7, wherein modifying the flow of the audio visual data from the central server to the network device in response to the control command such that the network device interactively controls the flow of audio visual data from the central server to the network device does not comprise downloading the audio visual data.

22. In a first network including a local server coupled to a central server, the local server being coupled to a plurality of network devices via a second network, a method of interactively controlling from one of the plurality of network devices a flow of audio visual data from the central server to the network device, the method comprising:

receiving a control command at the central server from one of the plurality of network devices via the local server, the control command indicating a desired modification to the flow of the audio visual data from the central server to the network device via the local server; and modifying the flow of the audio visual data from the central server to the network device via the local server in response to the control command, thereby enabling the flow of audio visual data from the central server to the network device to be interactively controlled by the network device such that the network device interactively controls the flow of audio visual data from the central server to the network device.

23. In a first network including a local server coupled to a central server, the local server being coupled to a plurality of network devices via a second network, a method of transmitting an audio visual data stream from the central server to one of the plurality of network devices, the method comprising:

receiving a control command from one of the plurality of network devices, the control command indicating a desired modification to the audio visual data stream being transmitted from the central server to the one of the plurality of network devices via the local server; and sending a modified audio visual data stream from the central server to the one of the plurality of network devices via the local server in response to the control command, thereby enabling a audio visual data stream being transmitted from the central server to the network device to be interactively controlled from the network device such that the network device interactively controls the flow of audio visual data from the central server to the network device.

24. In a first network including a local server coupled to a central server, the local server being coupled to a plurality of network devices via a second network, a method of interactively controlling from one of the plurality of network devices a flow of audio visual data from the central server to the network device, the method comprising:

receiving a control command at the local server from the network device via the second network, the control command indicating a desired modification to the flow of the audio visual data from the central server to the network device;

sending the control command from the local server to the central server via the first network;

receiving a modified audio visual data flow at the local server from the central server via the first network in response to the control command; and transmitting the modified audio visual data flow from the local server to the network device via the second network, thereby enabling the network device to interactively modify the flow of the audio visual data from the central server to the network device.

25. The method as recited in claim 24, further comprising:

determining whether a file associated with the control command is stored in a memory associated with the local server; and performing the sending the control command and receiving the modified audio visual data flow steps when the file associated with the control command is not stored in the memory associated with the local server.

26. The method as recited in claim 24, further comprising:

prior to sending the modified audio visual data flow from the local server to the network device, storing the modified audio visual data flow in a memory associated with the local server.

27. The method as recited in claim 24, wherein the modified audio visual data flow is associated with a first file that is different from a second file associated with the audio visual data that is sent from the central server to the network device.

28. The method as recited in claim 24, wherein the modified audio visual data flow is sent from the local server to the network device at a speed identical to that of the modified audio visual data flow received from the central server.

29. The method as recited in claim 24, wherein the modified audio visual data flow is received by the local server at a speed that is different from a speed of the flow of the audio visual data from the central server to the network device prior to sending the control command to the central server.

30. The method as recited in claim 24, wherein the modified audio visual data flow is initiated at a first point in a file that is different from a second point in the file at which the control command is received at the local server during the flow of the audio visual data.

31. The method as recited in claim 24, the audio visual data is associated with a first file and the modified audio visual data flow is associated with a second file.

32. The method as recited in claim 31, wherein the first file is different from the second file.

33. The method as recited in claim 31, wherein the first file identical to the second file.

34. The method as recited in claim 31, wherein the first file is a movie file or a karaoke file and the second file is a movie file or a karaoke file.

35. The method as recited in claim 24, wherein the first network is the Internet.

36. The method as recited in claim 24, wherein the first network is a wide area network and the second network is a local area network.

37. The method as recited in claim 24, wherein each of the plurality of network devices is coupled to the local server via a switch.

38. The method as recited in claim 37, wherein each of the plurality of network devices is a set-top box.

39. The method as recited in claim 24, wherein the second network is a wireless local area network.

40. In a first network including a local server coupled to a central server, the local server being coupled to a plurality of network devices via a second network, a method of interactively controlling from one of the plurality of network devices a flow of audio visual data from the central server to the network device, the local server having a memory associated therewith, the method comprising:

receiving a control command at the local server from the network device via the second network, the control command indicating a desired initiation of audio visual data flow associated with a specified file;

determining whether the specified file is stored in the memory associated with the local server; and when it is determined that the specified tile is not stored in the memory associated with the local server, sending the control command from the local server to the central server via the first network, receiving an audio visual data stream from the central server at the local server via the first network in response to the control command; and sending the audio visual data stream from the local server to the network device via the second network such that the network device interactively controls the flow of audio visual data from the central server to the network devices; wherein the central server is configured to transmit a modified audio visual data stream in response to another control command received from the network device, the other control command indicating a desired modification to the flow of the audio visual data.

41. The method as recited in claim 40, further comprising:
when it is determined that the specified file is not stored in the memory associated with the local server, storing the audio visual data stream in a file in the memory associated with the local server.

42. The method as recited in claim 40, further comprising:
receiving compressed data associated with the specified file from the central server at the local server via the first network in response to the control command; and storing the specified file in the memory associated with the local server.

43. The method as recited in claim 40, wherein the first network is the Internet.

44. The method as recited in claim 40, wherein the first network is a wide area network and the second network is a local area network.

45. The method as recited in claim 40, wherein each of the plurality of network devices is coupled to the local server via a switch.

46. The method as recited in claim 45, wherein each of the plurality of network devices is a set-top box.

47. The method as recited in claim 40, wherein the second network is a wireless local area network.

48. In a local server, the local server being coupled to a central server in a first network, the local server being coupled to a plurality of network devices via a second network, a method of interactively controlling from one of the plurality of network devices a flow of audio visual data from the central server to the network device, the local server having a memory associated therewith, the method comprising:

receiving a control command at the local server from the network device via the second network, the control command indicating a desired initiation of data flow associated with a specified file;

sending the control command from the local server to the central server via the first network;

receiving an audio visual data stream from the central server at the local server via the first network in response to the control command; and transmitting the audio visual data stream from the local server to the network device via the second network such that the network device interactively controls the flow of audio visual data from the central server to the network device; wherein the central server is configured to transmit a modified audio visual data stream in response to another control command received from the network device, the other control command indicating a desired modification to the flow of the audio visual data.

49. The method as recited in claim 48, further comprising:
storing the audio visual data stream in the memory associated with the local server.

50. The method as recited in claim 48, wherein the first network is the Internet.

51. The method as recited in claim 48, wherein the first network is a wide area network and the second network is a local area network.

52. The method as recited in claim 51, wherein the wide area network is a wireless network.

53. The method as recited in claim 48, wherein each of the plurality of network devices is coupled to the local server via a switch.

54. The method as recited in claim 53, wherein each of the plurality of network devices is a set-top box.

55. A central server for transmitting an audio visual data stream from the central server to one or more of a plurality of network devices via a local server, comprising:

a processor; and a memory, at least one of the processor and the memory being configure for:

receiving a control command at the central server from one of the plurality of network devices via the local server, the local server being coupled to the central server via a first network and being coupled to the plurality of network devices via a second network, the control command indicating a desired modification to the audio visual data stream being transmitted from the central server to the one of the plurality of network devices via the local server; and sending a modified audio visual data stream from the central server to the network device via the local server in response to the control command, thereby enabling an audio visual data stream being transmitted from the central server to the network device to be interactively controlled from the network device.

56. A local server, comprising:

a processor; and a memory, at least one of the processor and the memory being configured for:

receiving a control command at the local server from one of a plurality of network devices via a second network, the local server being coupled to a central server via a first network and being coupled to the plurality of network devices via the second network, the control command indicating a desired modification to a flow of audio visual data from the central server to the network device;

sending the control command from the local server to the central server via the first network;

receiving a modified audio visual data flow at the local server from the central server via the first network in response to the control command; and transmitting the modified audio visual data flow from the local server to the network device via the second network, thereby enabling the network device to interactively modify the flow of the audio visual data from the central server to the network device.

57. The local server as recited in claim 56, at least one of the processor and the memory being further configured for:
determining whether a file associated with the control command is stored in a memory associated with the local server; and
performing the sending the control command and receiving the modified audio visual data flow steps when the file associated with the control command is not stored in the memory associated with the local server.

58. A local server comprising:
a processor; and
a memory, at least one of the processor and the memory being configured for:
receiving a control command at the local server from one of a plurality of network devices via a second network, the local server being coupled to a central server via a first network and being coupled to the plurality of network devices via the second network, the control command requesting an initiation of audio visual data flow associated with a specified file;
determining whether the specified file is stored in a memory associated with the local server; and
when it is determined that the specified file is not stored in the memory associated with the local server, sending the control command from the local server to the central server via the first network, receiving an audio visual data stream at the local server from the central server via the first network in response to the control command and sending the audio visual data stream from the local server to the network device via the second network such that the network device interactively controls the flow of audio visual data from the central server to the network device; wherein the central server is configured to transmit a modified audio visual data stream in response to another control command received from the network device, the other control command indicating a desired modification to the flow of the audio visual data.

59. The local server as recited in claim 58, at least one of the processor and the memory being further configured for:
storing the audio visual data stream in a file in the memory associated with the local server.

60. A system for enabling a continuous stream of audio visual data to be sent to a network device, comprising:
a central server having a memory associated therewith, the memory having stored therein a plurality of files;
a local server coupled to the central server via a first network and having a memory associated therewith, the local server configured to obtain a file from the central server when the file that is requested is not stored in the memory associated with the local server; and
a plurality of network devices coupled to the local server via a second network, each of the plurality of network devices being configured for sending a file request to the local server, the file request indicating a request for audio visual data associated with a requested file; wherein the local server is configured to transmit an audio visual data stream associated with the file to one of the plurality of network devices via the second network when the file is obtained from the central server in response to the file request received from the one of the plurality of network devices, wherein the central server is configured to transmit a modified audio visual data stream in response to a control command received from the one of the plurality of network devices, wherein each of the plurality of network devices is configured to send the control command indicating a desired modification to the audio visual data stream being transmitted to the corresponding network device, and wherein the local server is configured to process the modified audio visual data stream transmitted by the central server to the network device such that the network device interactively controls the flow of audio visual data from the central server to the network device.

61. The system as recited in claim 60, wherein the local server is configured to store the file in the memory when the file is obtained from the central server.

62. The system as recited in claim 60, wherein the first network is the Internet.

63. The system as recited in claim 60, wherein the first network is a wide area network and the second network is a local area network.

64. The system as recited in claim 60, wherein each of the plurality of network devices is coupled to the local server via a switch.

65. The system as recited in claim 64, wherein each of the plurality of network devices is a set-top box.

66. A local server comprising:
a processor; and
a memory associated therewith, at least one of the processor and the memory being configured for:
receiving a first control command at the local server from one of a plurality of network devices via a second network, the local server being coupled to a central server via a first network and being coupled to the plurality of network devices via the second network, the first control command indicating a desired initiation of data flow associated with a specified file;
forwarding the first control command from the local server to the central server via the first network;
receiving an audio visual data stream from the central server at the local server via the first network in response to the first control command;
transmitting the audio visual data stream from the local server to the network device via the second network such that the network device interactively controls the flow of audio visual data from the central server to the network device;
receiving a second control command at the local server from the network device via the second network, the second control command indicating a desired modification of data flow;
forwarding the second control command from the local server to the central server via the first network;
receiving a modified audio visual data stream from the central server at the local server via the first network in response to the second control command; and
transmitting the modified audio visual data stream from the local server to the network device via the second network such that the network device interactively modifies the flow of audio visual data from the central server to the network device.

67. The local server as recited in claim 66, at least one of the processor and the memory being further configured for:
storing the first audio visual data stream in the memory associated with the local server.

68. The local server as recited in claim 66, wherein the specified file is a karaoke file.

69. The local server as recited in claim 66, wherein the specified file is a movie file.

70. A network device configured to interactively control a flow of audio visual data from a central server to the network device, comprising:

a processor; and a memory, at least one of the processor and the memory being configured for:

obtaining a control command at the network device, the control command indicating a desired modification to a flow of the audio visual data from the central server to the network device;

sending the control command from the network device to a local server via a second network, the local server being coupled to the central server via a first network and being coupled to the network device via the second network, wherein the local server is configured to transmit audio visual data received from the central server to the network device and configured to send the control command from the local server to the central server via the first network; and receiving a modified flow of the audio visual data from the central server at the network device in response to the control command such that the network device interactively controls the flow of audio visual data from the central server to the network device.

71. A computer-readable medium containing computer executable instructions for interactively controlling from a network device a flow of audio visual data from a central server to the network device, comprising:

instructions for receiving a control command at a local server from the network device, the control command indicating a desired initiation of data flow associated with a specified file;

instructions for sending the control command from the local server to the central server via the Internet, the central server being coupled to the network device via the local server, wherein the local server is coupled to a plurality of network devices including the network device;

instructions for receiving an audio visual data stream at the local server transmitted from the central server via the Internet in response to the control command; and instructions for sending the audio visual data stream from the local server to the network device such that the network device interactively controls the data flow from the central server to the network device; wherein the central server is configured to transmit a modified audio visual data stream in response to another control command received from the network device, the other control command indicating a desired modification to the flow of the audio visual data.

72. The computer-readable medium as recited in claim 71, further comprising:

instructions for transmitting the audio visual data stream from the local server to the network device via a switch.

73. The computer-readable medium as recited in claim 71, further comprising:

instructions for requesting by the local server that the specified file be downloaded to the local server from the central server.

74. The computer-readable medium as recited in claim 71, wherein the specified file is a karaoke file.

75. The computer-readable medium as recited in claim 71, wherein the specified file is a movie file.

\* \* \* \* \*